Figure 1:
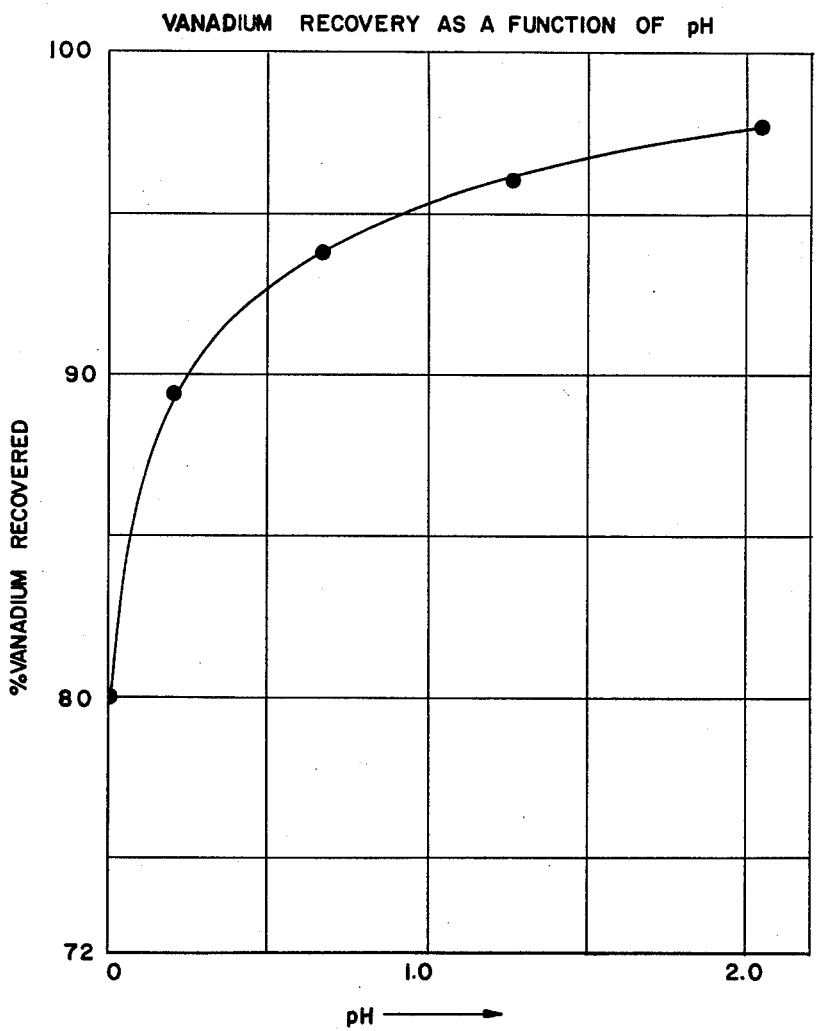
Figure 2:
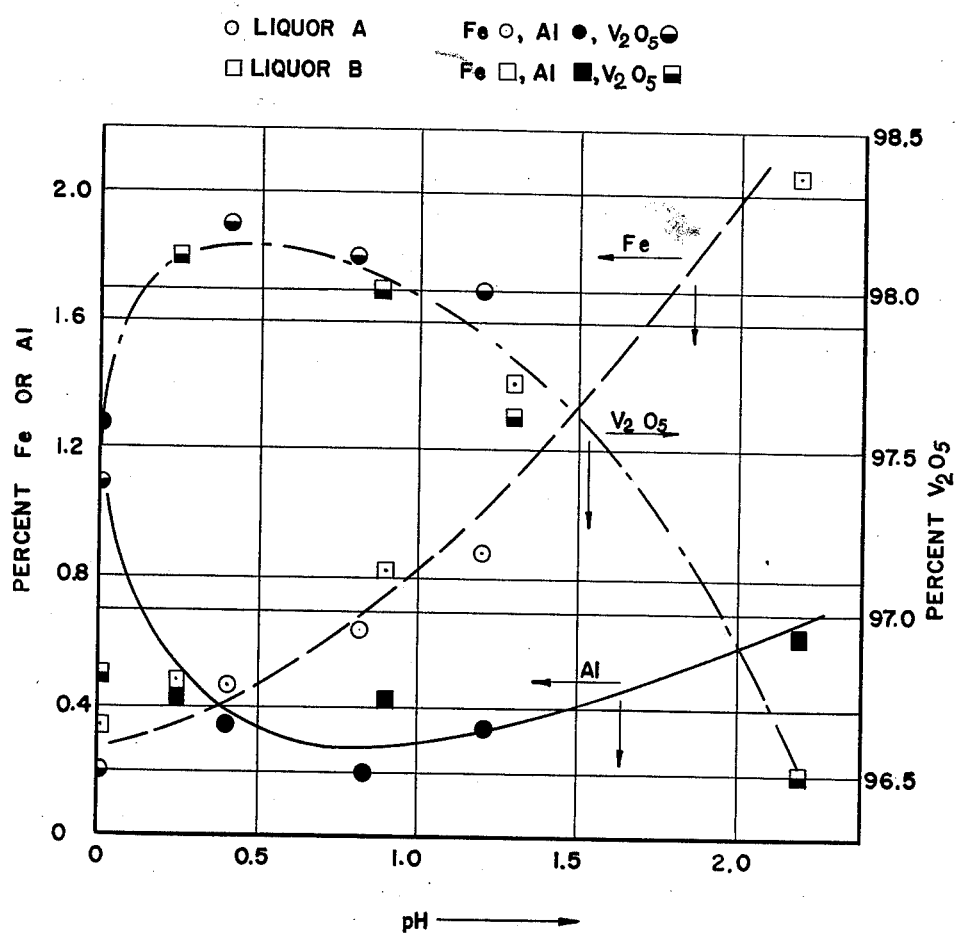

June 22, 1965

A. D. KELMERS ETAL 3,190,719

PROCESS FOR DIRECT AND SELECTIVE RECOVERY OF VANADIUM
VALUES FROM AQUEOUS SOLUTIONS THEREOF

Filed Aug. 15, 1962

2 Sheets-Sheet 1

INVENTORS
WILLIAM KOENEN
ANDREW D. KELMERS
BY Harrie M. Humphreys

ATTORNEY

3,190,719
PROCESS FOR DIRECT AND SELECTIVE RECOVERY OF VANADIUM VALUES FROM AQUEOUS SOLUTIONS THEREOF

Andrew D. Kelmers, Newport Beach, Calif., and William Koenen, Pompton Plains, N.J., assignors to Union Carbide Corporation, a corporation of New York
Filed Aug. 15, 1962, Ser. No. 217,194
7 Claims. (Cl. 23—22)

The present invention relates to the recovery of highly pure vanadium values from phosphorous, iron and alumina contaminated aqueous vanadium containing solutions.

There are several known methods of removing vanadium from an aqueous solution including precipitating the vanadium content of an alkaline vanadium bearing liquor containing from 30 to 60 grams of $V_2O_5$/liter and about 40 to 100 grams per liter of sodium salts such as NaCl or $Na_2SO_4$ as $Na_2H_2V_6O_{17}$, i.e. red cake, by adjusting the pH of the liquor to 3–3.5, heating the solution to boiling and digesting the solution for a number of hours. The red cake is then washed with ammonium sulfate and calcined to form $V_2O_5$ containing up to 15 weight percent impurities such as aluminum, iron, arsenic as well as large amounts of sodium as is shown by the red cake formula above. Recently issued U.S.P. 2,992,892 discloses and claims a continuous process for precipitation of vanadium oxides. In this patent the liquor, essentially containing pentavalent vanadium, is heated to a temperature of greater than 80° C. and adjusted in pH of about 0.5–1.7 to cause precipitation of vanadium. There is no teaching in the patent of a method of selective removal of vanadium from such impurities as iron and alumina. While the process disclosed in the patent does appear to eliminate minor amounts of phosphorus, there is no extensive removal of phosphorous from the vanadium containing precipitate.

It is an object of the present invention to provide a single precipitation process for selective removal of vanadium from iron and alumina contaminants, which process is readily amenable for use either as a batch or continuous process.

It is another object to provide a process for selectively removing iron and alumina free vanadium precipitates from iron and alumina contaminated vanadium containing starting solutions as well as a process wherein phosphorous is essentially eliminated from the vanadium precipitate.

It is a still further object to provide a process for producing, by precipitating all the solubilized vanadium only once but a portion of the vanadium being precipitated in each of two distinct steps by different mechanisms and at non-coextensive pH ranges, a vanadium product containing greater than 98.0 weight percent $V_2O_5$, less than 2.0 weight percent sodium, less than about 0.7 weight percent aluminum, less than 0.8 weight percent iron and less than 0.03 weight percent phosphorous and less than 0.03 weight percent sulfur.

The process satisfying the aforementioned objects comprises securing an aqueous iron, phosphorous and aluminum contaminated starting solution containing quadrivalent vanadium values; adjusting the pH to about $0.0\pm0.1$; adjusting the temperature of said solution to a range from about ambient temperature to about 80° C. and oxidizing said quadrivalent vanadium values to the pentavalent state while maintaining said pH at less than about 0.1 to cause selective precipitation of approximately 80 weight percent of the vanadium values in said aqueous solution largely as hydrated oxidic vanadium; thereafter adjusting the pH of said aqueous solution to a range from about 0.3 to about 1.0 by addition of at least one reagent selected from the group consisting of ammonium hydroxide and ammonia to cause further selective precipitation of substantially all of the vanadium values remaining in solution as ammonium polyvanadate; digesting said aqueous solution containing the precipitates for about 1.0 hour at a temperature of about ambient temperature to about 80° C.; filtering said precipitates; washing said precipitates with water at a pH of about 1.0; and fusing said precipitate to produce vanadium pentoxide very low in phosphorous, aluminum and iron.

Vanadium precipitation in the present process is conducted only once but portions are precipitated in each of two steps; that is all the vanadium is precipitated only once, but portions of the vanadium are precipitated over two non-coextensive pH ranges and utilizing a different precipitation mechanism over each pH range. In describing this facet of the present invention, reference will be made to the attached FIG. I and FIG. II.

FIG. I shows the graphical relationship of the percent of pentavalent vanadium recovered as a precipitate from an aqueous pentavalent vanadium containing solution as a function of the pH of the solution. It is readily apparent that increasing pH values at least up to about 2.0 result in continuously increasing amounts of vanadium precipitation. At first glance it is apparent that it would be most desirable to recover the vanadium from the solutions by causing precipitation of hydrated vanadium oxide at some pH greater than about 1.0 and definitely greater than about 0.5. In this manner high yields would be secured as is evidenced by FIG. I.

We have found that this is not the case. In addition to the high yield desired in a commercial process, it is also desirable and, indeed in the industry to which the present process relates, necessary to produce a product which is of very high grade. As mentioned in the aforementioned objects, the present process contemplates producton of and will actually produce a vanadium product which contains greater than 98.0 weight percent $V_2O_5$, less than about 0.7 weight percent aluminum, less than 0.8 weight percent iron and less than about 0.03 weight percent of phosphorous and 0.03 weight percent sulfur. Accordingly, while vanadium recovery must be kept at a very high level, i.e. yield must be kept at a very high level, so also must the product grade be kept at a very high level in order to fulfill the aforementioned product specifications.

FIG. II shows an integrated plot of the percentages of two of the major contaminants, aluminum and iron, along with the $V_2O_5$ values in the final precipitated products as a function of the pH of the solution.

We have found that product grade can be greatly improved if approximately 80 percent of the vanadium values in the iron and aluminum contaminated solution are selectively precipitated, as hydrated vanadium oxides, by oxidizing the vanadium values in the incoming vanadium bearing starting solution while simultaneously adjusting and/or maintaining the pH of the solution at about 0.0±0.1. In this manner, as shown in FIG. I, precipitation of a portion of the vanadium values is readily achieved. By the same token, it is clearly shown in FIG. II that only a very small amount of iron is precipitated concurrently with the precipitation of about 80 of the total vanadium in solution. Although it is not shown in the graph, there is very little alkali metal contamination at this pH. That is the vanadium selectively precipitates as a hydrated vanadium oxide rather than as a sodium polyvanadate for example. During the initial precipitation of about 80 percent of the vanadium at a pH of about 0.0, it appears that rather large amounts of aluminum contaminants would precipitate thereby considerably lowering the grade of the product. As will be explained later, this in itself does not appear to cause a significant aluminum contamination in the final product. Accordingly then, an approximate initial 80 percent proportion of the vanadium values are precipitated at a very low pH as hydrated vanadium oxides with only minute amounts of iron contaminants. The overall product grade at this point is generally 97.0±0.5 weight percent $V_2O_5$.

The next step in the process is to adjust the pH of the solution to a range from about 0.3 to about 1.0 and preferably 0.6 to about 1.0 essentially with ammonium hydroxide and/or gaseous ammonia. During this step, substantially all of the remaining vanadium values are selectively precipitated. During this portion of the precipitation being conducted at an elevated pH, it is shown in FIG. II that there is some increase in extent of iron contamination over and above that encountered at a pH of about 0.0 but this amount is not considered detrimental to the product. If the precipitation had been completely carried out at a pH of from 0.5 to about 1.0 the percentage of iron contamination in the final product would have been much greater. During the second precipitation stage, as is shown by FIG. II, there is a considerable decrease in the percentage of aluminum contaminating the final product. The mechanism responsible for the decrease in the overall percentage of aluminum in the final product when the second stage of precipitation is conducted at a range from about 0.6 to 1.0 is not fully known. Still it is readily apparent that the minimum in the amount of contaminating alumnium at pH ranges from about 0.6 to 1.0 as shown in FIG. II is much more than could or would be predicted due to the mere precipitation of more vanadium and iron at the elevated pH stage of vanadium precipitation.

In the elevated pH precipitation stage it is essential that ammonium hydroxide and/or ammonia be utilized to adjust pH and cause precipitation of vanadium values as ammonium polyvanadates. The pH of the solution could not merely be adjusted to the elevated range with any other known basic material to cause precipitation of the remaining vanadium in solution because at the elevated pH of the second stage the vanadium would precipitate as an alkali polyvanadate such as sodium polyvanadate. This results in severe alkali metal contamination in the final $V_2O_5$ product since the calcination step does not remove alkali metal contaminants. Accordingly, at the elevated pH precipitation it is essential that the remaining vanadium values must be precipitated as ammonium polyvanadates. During subsequent calcination of the ammonium polyvanadate precipitate to form the final vanadium pentoxide product, the ammonium ions are eliminated as ammonia.

Oxidation prior to the first stage of precipitation at low pH is conducted at a temperature ranging from about ambient temperature to about 80° C. The optimum temperature is about 80° C. since oxidation is virtually instantaneous at this temperature. At a temperature of 25° C. it requires about one hour to complete the oxidation. Any suitable known vanadium oxidizing agent, in general, which does not detrimentally affect the system may be used. It has been found that sodium chlorate is an effective, efficient and reasonably priced oxidant for use at this stage in the process.

Note, it is essential, when sodium chlorate is used as the oxidant, that the vanadium values be completely oxidized and the oxidant should be completely expended prior to the addition of ammonia and/or ammonium hydroxide to the system. If this practice is not followed, there is considerable danger that explosive gases such as chlorine dioxide and nitrogen trichloride form and cause explosions.

After the precipitation of vanadium is completed, the spent solution and precipitate are digested for a period of about one hour, for example, to cause formation of a readily filtered precipitate. If no digestion of the spent solution and precipitate is conducted, it has been found that the precipitate is only difficultly filterable and there is considerable loss in filter efficiency.

After digestion and filtration the precipitate is washed with water at a pH of about 1.0 to remove phosphorous contaminants from the precipitate. It is preferable that the pH not be much lower than about 1.0 nor that the treatment or wash be extended unduly because of the danger of resolubilizing some of the vanadium values. This phosphorous removal step is preferably conducted at a temperature of about 80° C. Alternatively before fusing the mixed hydrated vanadium oxide and ammonium polyvanadate it may be desirable to wash the precipitates in pure water after the phosphorous removal step and indeed it is a preferred procedure in the present process because this treatment tends to wash any residual $H_2SO_4$ from the precipitate.

After the precipitates have been treated for phosphorous removal, and alternatively washed, they are fused to form a final $V_2O_5$ product within the limits set out in the aforementioned specification. The fusion step is commonly conducted at a temperature ranging from about 850° C. to about 950° C.

By way of illustration, a number of contrasting examples of the present and related processes are presented below. These examples and experiments should be an aid in understanding the present invention.

The first group of examples were conducted at conditions calculated to achieve maximum recovery or vanadium yield regardless of product grade. Six individual tests were conducted, namely tests a–f, using six different starting aqueous vanadium containing solutions. These solutions were actual stripping solutions resulting directly from the stripping of organic solvent extractants in a commercially operated process. In all cases, the pH of the starting stripping solutions was 0.0±0.1 and the vanadium was in the quadrivalent state. The analysis of the strip liquors used in the following tests a–k is given below in Table I.

TABLE I

| Liquor No. | Analysis, grams/liter | | | | | | |
|---|---|---|---|---|---|---|---|
| | $V_2O_5$ | Fe | Al | As | Se | PO$_4$ | SO$_4$ |
| 1 | 83.24 | 1.32 | 1.83 | 0.19 | 0.01 | 0.02 | 111 |
| 2 | 77.23 | 1.50 | 3.56 | 0.14 | 0.02 | 0.11 | 112 |
| 3 | 68.05 | 0.95 | 3.24 | 0.21 | 0.01 | 0.17 | |
| 4 | 65.20 | 1.06 | 4.48 | 0.16 | 0.02 | 0.21 | 105 |
| 5 | 56.97 | 1.32 | 5.27 | 0.47 | 0.05 | 0.72 | 106 |
| 6 | 44.94 | 1.42 | 5.48 | 0.26 | 0.01 | 0.47 | 106 |
| 7 | 70.06 | 1.10 | 4.45 | 0.32 | 0.01 | 0.52 | 126 |
| 8 | 74.70 | 1.04 | 1.99 | 0.25 | | 0.38 | 123 |

Since the strip liquors were highly acidic, i.e. pH 0.0±0.1, they required no adjustment of the pH prior to the first precipitation stage. The strip liquors were simply heated to a temperature of about 80° C. and sufficient $NaClO_3$ was added to convert all the quadrivalent vanadium values to pentavalent vanadium values. At this point, almost instantaneously upon oxidation of the vanadium to the pentavalent state the vanadium values precipitated as hydrated vanadium oxide. The pH of the solution was then adjusted to a range from about 1.5 to 1.8 by the addition of ammonium hydroxide to the partially vanadium spent stripping solution. The remaining vanadium precipitated as sodium polyvanadate. The spent solution and precipitates were digested for about one hour at 80° C. and the precipitates were filtered. The amount of vanadium precipitated was calculated from the concentration of the vanadium remaining in the filtrate, i.e. the vanadium spent stripping solution. The precipitates were then reslurried in a water solution containing $H_2SO_4$ and a temperature of about 80° C. and subsequently washed with plain water at a temperature of 80° C. The washed precipitate was then fused for about one hour at 850° C. and analyzed.

The following Table II shows the vanadium distribution and reagent consumption for tests a–f with averages and Table III shows the analysis of the products of tests a–f with an average analysis indicated. The arsenic was selectively removed from the starting stripping solution in all the tests a–k in the present process, via the process disclosed and claimed in U.S. application Serial No. 217,173, filed August 15, 1962, by Koenen et al.

TABLE II

*Maximum vanadium removery—Vanadium distribution and reagent consumption*

| Test | Strip liquor | Vanadium precipitated, percent | Percent loss to— | | Reagent consumption, per lb. $V_2O_5$ | |
|---|---|---|---|---|---|---|
| | | | Acid wash | $H_2O$ wash | Lb. $NH_3$ | Lb. $NaClO_3$ |
| a | 7 | 98.5 | 0.3 | 0.07 | 0.77 | 0.26 |
| b | 2 | 93.5 | 0.6 | 0.2 | 0.56 | 0.23 |
| c | 1 | 98.6 | 0.8 | 0.2 | 0.55 | 0.22 |
| d | 4 | 99.0 | 1.6 | 0.6 | 0.59 | 0.28 |
| e | 5 | 99.2 | 2.0 | 0.6 | 0.70 | 0.33 |
| f | 6 | 98.5 | 0.7 | 0.2 | | 0.40 |
| Average | | 98.7 | 1.0 | 0.3 | 0.63 | 0.29 |

TABLE III

*Maximum vanadium recovery—Product analyses*

| Test | Percent $V_2O_5$ | Percent Fe | Percent Al | Percent As | Percent Na | Percent S | Percent P |
|---|---|---|---|---|---|---|---|
| a | 97.3 | 1.25 | 0.005 | 0.08 | 0.08 | 0.015 | 0.01 |
| b | 97.9 | 1.09 | 0.13 | 0.005 | 0.08 | 0.018 | 0.01 |
| c | 98.1 | 0.92 | 0.01 | 0.005 | 0.15 | 0.01 | 0.01 |
| d | 97.9 | 0.95 | 0.19 | 0.005 | 0.11 | 0.01 | 0.01 |
| e | 97.1 | 1.29 | 0.04 | 0.005 | 0.14 | 0.01 | 0.01 |
| f | 95.9 | 2.47 | 0.06 | 0.005 | 0.12 | 0.01 | 0.01 |
| Average | 97.4 | 1.33 | 0.09 | 0.005 | 0.11 | 0.01 | 0.01 |

The vanadium distribution and reagent consumption are shown in Table II. The vanadium precipitation averaged 98.7%. An average of 1.3% of this vanadium was redissolved in the wash solutions. An average reagent consumption of 0.64 lb. of ammonia per pound of $V_2O_5$ and 0.30 lb. of $NaClO_3$ was experienced.

The analyses of the fused $V_2O_5$ produced, presented in Table III, show that iron coprecipitation has decreased the average $V_2O_5$ grade to 97.4% just under the specification limit of 98%. The iron contamination was very high averaging about 1.33 weight percent. This is in very good agreement with the data in FIG. II which predicts a $V_2O_5$ grade of 97.3% at a pH of 1.6–1.7 and very high iron contents.

The following group of tests were conducted to show operaton of the present process whereby an optimum grade product is produced at very high yields of vanadium. This series of tests, namely g–k, were conducted in the same manner as the aforementioned group of tests except that the pH during the second stage of precipitation was adjusted to about 0.8 to about 1.0 with ammonium hydroxide. The optimum product grade, with averages, is shown in Table IV and the analysis of the products of tests g–k are shown, with averages, in Table V.

TABLE IV

*Optimum product grade—Vanadium distribution and reagent consumption*

| Test | Strip liquor | Vanadium precipitated, percent | Loss to wash solutions (acid and pure $H_2O$), percent | Regeant consumption, per lb. $V_2O_5$ | |
|---|---|---|---|---|---|
| | | | | Lb. $NaClO_3$ | Lb. $NH_3$ |
| g | 1 | 98.0 | 1.4 | 0.25 | 0.44 |
| h | 3 | 97.1 | 2.1 | 0.34 | 0.55 |
| i | 5 | 96.4 | 2.1 | 0.36 | 0.54 |
| j | 7 | 96.3 | 1.5 | 0.30 | 0.54 |
| k | 8 | 95.3 | 0.6 | 0.27 | |
| Average | | 96.6 | 1.5 | 0.30 | 0.52 |

TABLE V

*Optimum product grade—Product analyses*

| Test | Percent $V_2O_5$ | Percent Fe | Percent Al | Percent As | Percent Na | Percent S | Percent P |
|---|---|---|---|---|---|---|---|
| a | 98.3 | 0.64 | 0.14 | 0.005 | 0.16 | 0.01 | 0.03 |
| b | 97.8 | 0.62 | 0.24 | 0.005 | 0.13 | 0.01 | 0.01 |
| c | 97.3 | 1.08 | 0.27 | 0.005 | 0.10 | 0.01 | 0.05 |
| d | 98.1 | 0.68 | 0.24 | 0.01 | 0.13 | 0.01 | 0.01 |
| e | 98.4 | 0.52 | 0.15 | 0.005 | 0.13 | 0.01 | 0.03 |
| Average | 98.0 | 0.71 | 0.21 | 0.005 | 0.13 | 0.01 | 0.02 |

It is readily apparent from the aforementioned data and discussion that the present process represents a substantial contribution to the art of processing vanadium ores. While the present process has been described above with some particularity it is contemplated that minor modifications may be made in the subject process without departing from the spirit and scope thereof.

What we claim is:

1. A process for selectively recovering highly pure vanadium values at high yield from iron, phosphorus and aluminum contaminated aqueous vanadium containing solutions comprising:

(1) providing an aqueous iron, phosphorus and aluminum contaminated starting solution containing quadrivalent vanadium values, (2) adjusting the pH of said solution to about 0.0±0.1, (3) heating said solution and maintaining its temperature at about 25 to 80° C., while (4) oxidizing said quadrivalent vanadium values to the pentavalent state with an oxidizing agent, while manitaining the pH of said solution below about 0.1, thereby causing precipitation of approximately 80 weight percent of the vanadium values in said solution as hydrated vanadium oxides, then (5) adjusting the pH of said aqueous solution to be within the range of from about 0.3 to 1.0 by the addition of at least one reagent selected from the group consisting of ammonium hydroxide and ammonia, thereby causing further selective precipitation of the remaining vanadium values in said solution as ammonium polyvanadates, (6) digesting said aqueous solution containing the precipitates for about one hour at a temperature ranging from about 25 to 80° C., and (7) separating said precipitates from the solution by filtration.

2. The process of claim 1 which includes the additional steps of washing said precipitates with water at a pH of about 1.0, and thereafter fusing said washed precipitates to produce vanadium pentoxide.

3. The process of claim 2 wherein said washed precipitate is washed a second time with pure water at a temperature ranging from about 25 to 80° C. prior to fusion.

4. A process for selectively recovering highly pure vanadium values at high yield from iron, phosphorus and aluminum contaminated aqueous vanadium containing solutions comprising:
   (1) providing an aqueous iron, phosphorus and aluminum contaminated starting solution containing quadrivalent vanadium values,
   (2) adjusting the pH of said solution to about $0.0 \pm 0.1$,
   (3) heating said solution and maintaining its temperature at about 25 to 80° C., while
   (4) completely oxidizing said quadrivalent vanadium values to the pentavalent state with sodium chlorate, while maintaining said pH at less than about 0.1, thereby causing precipitation of approximately 80 percent of the vanadium values in said solution as hydrated vanadium oxides, then
   (5) adjusting the pH of said aqueous solution to a range of from about 0.6 to about 1.0 by the addition of at least one reagent selected from the group consisting of ammonium hydroxide and ammonia, thereby causing further selective precipitation of the remaining vanadium values in said solution as ammonium polyvanadates,
   (6) digesting said aqueous solution containing the precipitates for about one hour at a temperature of about 80° C., and
   (7) separating said precipitates from the solution by filtration.

5. The process of claim 4 which includes the additional steps of washing said precipitates with water at a pH of about 1.0, and thereafter fusing said washed precipitates to produce vanadium pentoxide.

6. The process of claim 5 wherein said washed precipitate is washed a second time with pure water at a temperature ranging from about 25 to 80° C. prior to fusion.

7. The process of claim 6 wherein the second washing of the precipitate with pure water is carried out at a temperature of about 80° C.

References Cited by the Examiner
UNITED STATES PATENTS

| | | | |
|---|---|---|---|
| 1,596,483 | 8/26 | Frick | 23—19.1 |
| 2,176,609 | 10/39 | McCormack | 23—19.1 |
| 2,479,905 | 8/49 | Cole et al. | 23—140 |
| 2,614,905 | 10/52 | Perrin | 23—140 X |

MAURICE A. BRINDISI, *Primary Examiner.*